United States Patent [19]
Stephens

[11] Patent Number: 5,601,641
[45] Date of Patent: *Feb. 11, 1997

[54] MOLD RELEASE COMPOSITION WITH POLYBUTADIENE AND METHOD OF COATING A MOLD CORE

[75] Inventor: William D. Stephens, Clearwater, Fla.

[73] Assignee: TSE Industries, Inc., Clearwater, Fla.

[*] Notice: The term of this patent shall not extend beyond the expiration date of Pat. No. 5,298,556.

[21] Appl. No.: 573,000

[22] Filed: Dec. 15, 1995

Related U.S. Application Data

[63] Continuation-in-part of Ser. No. 196,653, Feb. 14, 1994, abandoned, which is a continuation-in-part of Ser. No. 43,038, Apr. 5, 1993, Pat. No. 5,298,556, which is a continuation-in-part of Ser. No. 917,772, Jul. 21, 1992, Pat. No. 5,219,925.

[51] Int. Cl.⁶ .................... C09D 109/00; C09D 109/10; C09D 4/00; C08L 9/00
[52] U.S. Cl. .................... 106/38.25; 106/38.22; 106/38.24; 252/182.14; 252/182.18; 252/182.24; 264/51; 264/239; 264/328.1; 427/255.6; 427/337; 427/340; 427/372.2; 427/387; 427/388.4; 524/232; 524/267; 524/571; 524/572; 524/588; 524/836; 524/837
[58] Field of Search ................... 106/38.22, 38.24, 106/38.25; 252/182.14, 182.18, 182.24; 427/255.6, 337, 340, 372.2, 387, 388.4; 524/571, 572, 588, 836, 837, 232, 267; 264/51, 328.1, 239

[56] References Cited

U.S. PATENT DOCUMENTS

| | | | |
|---|---|---|---|
| Re. 32,318 | 12/1986 | Comper et al. | 106/38.22 |
| 3,894,881 | 7/1975 | Suzuki et al. | 106/287.58 |
| 4,534,928 | 8/1985 | Martin | 264/334 |
| 4,925,882 | 5/1990 | Makus | 521/132 |
| 5,079,299 | 1/1992 | Hisamoto et al. | 525/100 |
| 5,218,024 | 6/1993 | Krug et al. | 524/232 |
| 5,219,925 | 6/1993 | Stephens | 524/860 |
| 5,298,556 | 3/1994 | Stephens | 524/860 |
| 5,346,767 | 9/1994 | Tilley et al. | 428/412 |

OTHER PUBLICATIONS

Sax et al., *Hawley's Condensed Chemical Dictionary, Eleventh Edition*; Van Nostrand Reinhold; New York; 1987; pp. 1256, 1257.

Primary Examiner—James J. Seidleck
Assistant Examiner—Rabon Sergent
Attorney, Agent, or Firm—Larson & Larson, P.A.; Herbert W. Larson

[57] ABSTRACT

An aqueous reaction mixture having a pH of 4.5 to 5.5 of a methyl terminated siloxane emulsified polymer, a methyl triethoxysilane, a mixture of nonyl and octyl phenol derivative surfactants, fluorinated alkyl ester surfactant and synthetic ethoxylated amine surfactants, a silanol terminated polydimethylsiloxane hydroxyl terminated polybutadiene and ethanol. The reaction mixture is coated on a mold core surface and cured with heat to form a mold release surface that can be used in excess of twelve times prior to recoating.

10 Claims, No Drawings

MOLD RELEASE COMPOSITION WITH POLYBUTADIENE AND METHOD OF COATING A MOLD CORE

PRIOR APPLICATION

This application is a continuation-in-part from my application Ser. No. 08/196,653 filed Feb. 14, 1994, now abandoned, which is a continuation-in-part from my application Ser. No. 08/043,038, filed Apr. 5, 1993, (now U.S. Pat. No. 5,298,556) which is a continuation-in-part from my application Ser. No. 07/917,772, filed Jul. 21, 1992 (now U.S. Pat. No. 5,219,925).

BACKGROUND OF THE INVENTION

1. Field of The Invention

This invention relates to organopolysiloxane mold release compositions. More particularly, it refers to such mold release compositions also containing a methyl trimethoxy or triethoxysilane in an aqueous solution and methods for employing the composition in a mold.

2. Description of The Prior Art

In the process of preparing molded products such as urethanes, natural rubber, silicones, neoprene, and other synthetic elastomers, it is necessary to coat the core surfaces of molds to prevent the molded product from sticking to the mold. Coatings used to prevent such molded products from sticking to molds are called mold release agents. Some of the mold release agents previously used are solvent based, and some are water based. Polydimethylsiloxanes have been used as one of the ingredients in prior art mold release compositions, as well as methyl triethoxy silanes together with surfactants, and in many instances with a catalyst. U.S. Pat. No. Reissue 32,318 describes an aqueous lubricating composition for time curing bladders containing polydimethylsiloxane, methyl hydrogen or methyl trimethoxy silane, a surfactant and a metal salt of an organic acid. Organic solvents were specifically excluded from the composition because they degraded the rubber surfaces and required frequency of recoat. U.S. Pat. No. 3,894,881 describes coating compositions applied to a plastic substrate for providing improved scratch resistance. These scratch resistant compositions contain a hydrolyzed silicon tetraalkoxide, a methyl trimethoxy silane, and a metal salt. U.S. Pat. No. 4,534,928 describes mold release compositions containing a polydimethylsiloxane, an alkoxysilane such as methyl trimethoxy silane, a metal alkoxide, and a non reactive volatile organic solvent which is substantially water-free.

Although these prior art mold release compositions have the ability to release molded products, they suffer from the need to recoat the molds frequently, have odor problems, or are toxic. A mold release composition is needed that is environmentally friendly and will permit greater than twenty releases of molded urethane, natural rubber, neoprene, and other synthetic elastomer for transfer, compression, and injection molding.

SUMMARY OF THE INVENTION

I have discovered a unique mold release composition which is non-toxic, environmentally friendly, and will allow greater than twenty releases of a molded urethane, silicone, natural rubber, neoprene, or other synthetic elastomer during compression or injection molding procedures.

My composition is an aqueous reaction mixture of a methyl terminated polydimethylsiloxane emulsified polymer, a methyl triethoxysilane, substituted nonyl or octyl phenol derivative surfactants, fluoroalkyl surfactant, and synthetic ethoxylated amines, silanol terminated siloxane, ethanol, acetic acid and water. This reaction mixture can be coated on a mold core surface and cured with heat to form a semi-permanent mold release surface.

DETAILED DESCRIPTION OF THE INVENTION

Composition I of this invention is a reaction mixture of a multi-functional organo-silane crosslinker, and methyl terminated polydimethylsiloxane emulsified polymer in a solution of water and ethanol. This reaction mixture produces a reactive silane in a mixture of emulsified poly organo siloxanes forming an interpenetrating network on a mold core surface upon application of heat.

Composition II contains the ingredients as a percent by weight in the following ranges:

0.5 to 12% a silane selected from the group consisting of methyl triethoxysilane, methyl trimethoxysilane, ethyltriethoxysilane, fluoro-triethoxysilane, vinyl triethoxysilane, vinyl trimethoxysilane, Gamma-ureidopropyltrialkoxysilane, where the alkoxy group has one to three carbon atoms, Gamma-glycidoxypropyltrimethoxysilane, octyltriethoxysilane, Gamma-aminopropyltriethoxysilane, Gamma-isocyanatopropyitriethoxysilane, tetraethoxysilane, Gamma-methacryloxypropyl trimethoxysilane, Beta- (3,4-epoxycyclohexyl) ethyltrimethoxysilane, Gamma-mercaptopropyltrimethoxysilane, and vinyl-tris (2-methoxyethoxy) silane, 1 to 8% a methyl terminated polydimethylsiloxane emulsified polymer, 0.1 to 2.5% nonyl or octyl phenol surfactant, 0.05 to 4.0% fluoroalkyl surfactant, 0.1 to 2.5% synthetic ethoxylated amine surfactant, 0.1 to 12.5% silanol terminated polydimethyl siloxane having a weight average molecular weight from 400 to 310,000, 0.5 to 8% lower alkyl alcohol, wherein the alkyl has 1–3 carbon atoms, 70 to 97% water, and 0.5 to 1% a weak acid such as acetic acid to maintain the pH between 4.5 to 5.5.

Three to five grams of the composition is applied to each square foot of a mold core surface and then heated to about 320 degrees F. to form the interpenetrating network.

The two preferred compositions are prepared by mixing the following ingredients (% by weight) in water:

COMPOSITION I

3% methyl triethoxysilane, 1.8% deca methyl cyclopentasiloxane, 1.6% octo methyl cyclotetrasiloxane, 0.6% dodeca methyl cyclohexasiloxane, 1.5% surfactants which are a substituted nonyl and octyl phenol derivative and synthetic ethoxylated amines, 3.0% ethanol, and 8.5% water.

The methyl triethoxysilane reacts with the water to produce additional ethanol. The mixture is sprayed on a clean mold core surface and heated to 320 degrees F. to vaporize the water and coat the mold core.

The methyl triethoxysilane can be substituted with methyl trimethoxysilane, vinyl triethoxysilane or vinyl trimethoxysilane to achieve substantially the same results in the mixture and on spraying the resulting mixture on a mold core.

COMPOSITION II 3.4% methyl triethoxysilane,
1.8% deca methyl cyclopentasiloxane,
1.6% octo methyl cylotetrasiloxane,
0.6% dodeca methyl cyclohexasiloxane,
1.5% fluorinated alkyl ester surfactant,
0.5% substituted nonyl and octyl phenol surfactant,
0.3% synthetic ethoxylated amine surfactant,
2.6. % ethanol,
3.0% silanol terminated polydimethylsiloxane having a weight average molecular weight between 400 and 310,000,
1% acetic acid, and
83.7 water.

COMPOSITION III

Composition II is reacted with hydroxyl terminated polybutadiene. The resulting composition is processed with wax emulsions, fatty acid soaps, fatty acid esters, and a urethane catalyst to form an interpenetrating network on a mold surface. The composition forms a semi-permanent release agent for urethane foams. I have found that the polybutadiene assists in the release of poly urea from the process during the formation of urethane.

The following examples exemplify methods of preparing the compositions of this invention and applying them to mold core surfaces.

EXAMPLE I 197 grams of distilled water was mixed with 23 grams of the mixture of siloxanes set forth above in the preferred composition I, together with substituted nonyl and octyl phenol derivative and synthetic ethoxylated amine surfactant mixtures and 9.4 grams of methyl triethoxysilane. 120 grams of ethanol was mixed with 2725 grams of tap water, 30 grams of methyl triethoxysilane and 300 grams of the aforementioned siloxane and surfactant mixture. The two mixtures were then blended and sprayed on a four inch mold. Both sides of the mold were preheated to 320 degrees F. and cured for five minutes.

A polyether millable urethane compound was applied and cured in the mold and released twenty times with no noticeable sticking on the mold.

Additional mold release compositions were prepared in the manner of EXAMPLE I with the ingredients indicated by weight percent in the following EXAMPLES II–V.

EXAMPLE II

1% methyl triethoxysilane,
0.9% deca methyl cyclopentasiloxane,
0.8% octo methyl cyclotetrasiloxane,
0.6% dodeca methyl cyclohexasiloxane,
0.75% surfactants,
1.0% ethanol and
96.0% water.

EXAMPLE III

6% methyl triethoxysilane,
1.8% deca methyl cyclopentasiloxane,
1.6% octo methyl cyclotetrasiloxane,
0.6% dodeca methyl cyclohexasiloxane,
1.5% surfactants,
3.0% ethanol and
85.5% water.

EXAMPLE IV

8% methyl triethoxysilane,
3.6% deca methyl cyclopentasiloxane,
3.2% octo methyl cyclotetrasiloxane,
1.2% dodeca methyl cyclohexasiloxane,
3.0% surfactants,
6.0% ethanol and
75% water.

EXAMPLE V

12% methyl triethoxy silane,
3.6% deca methyl cyclopentasiloxane,
3.2% octo methyl cyclotetrasiloxane,
1.2% dodeca methyl cyclohexasiloxane,
3.0% surfactants,
6.0% ethanol and
71% water.

EXAMPLE VI

A mold was used that had an undercut and a difficult configuration to mold. In a mold such as this, molding compounds will easily stick and tear. The mold was first degreased and then sandblasted. Thereafter, the mold release composition of EXAMPLE I above, was sprayed on the mold in a thin coating heated to molding temperature. Each of the following fluoroelastomer molding compositions was separately applied to the mold and released from the mold after curing thirty times without tearing.

| MOLDING COMPOUND A | |
| --- | --- |
| INGREDIENTS | PHR |
| Viton E-60-C Dupont Fluoroelastomer | 100.0 |
| VPA No 3 Proprietary Viton Process Aid | 1.0 |
| Mag-D Magnesium Oxide | 3.0 |
| Calcium Hydroxide | 6.0 |
| N-990 Carbon black filler MT type | 30.0 |

| MOLDING COMPOUND B | |
| --- | --- |
| INGREDIENTS | PHR |
| Viton A401C Dupont Fluoroelastomer | 100.0 |
| Maglite D Magnesium Oxide | 3.0 |
| Calcium Hydroxide | 6.0 |
| Carnauba Wax | 1.0 |

MOLDING COMPOUND B

| INGREDIENTS | PHR |
| --- | --- |
| N-990 Carbon black filler MT type | 20.0 |
| Powdered Teflon MP-1500 | 10.0 |

MOLDING COMPOUND C

| INGREDIENTS | PHR |
| --- | --- |
| Viton A401C Dupont Fluoroelastomer | 100.0 |
| Maglite D Magnesium Oxide | 3.0 |
| Calcium Hydroxide | 6.0 |
| Carnauba Wax | 1.0 |
| N-990 Carbon black filler MT type | 35.0 |

EXAMPLE VII

A steel mold designed with a difficult undercut was employed. Any sticking at the undercut will result in a tear. The mold was first degreased and then sandblasted. The mold was heated to the molding temperature and the mold release composition of EXAMPLE I above was sprayed in the mold. Each of the following two silicone elastomer molding compositions were separately applied to the mold and released from the mold after curing. Thirty moldings were performed and no sticking or tearing occurred.

MOLDING COMPOUND D

| INGREDIENTS | PHR |
| --- | --- |
| General Electric Silicone SE-4404U | 100.0 |
| Titanium Dioxide | 1.0 |
| 2,5-Dimethyl-2,5-Di (t-butyl-peroxy) hexane | 1.0 |

MOLDING COMPOUND E

| INGREDIENTS | PHR |
| --- | --- |
| General Electric Silicone SE-88U | 100.0 |
| Titanium Dioxide | 1.0 |
| 2,5-Dimethyl-2,5-Di (t-butyl-peroxy) hexane | 1.0 |

EXAMPLE VIII

A steel mold designed with a difficult undercut was employed. Any sticking at the undercut will result in a tear. The mold was first degreased and then sandblasted. The mold was heated to the molding temperature and the mold release composition of EXAMPLE I above, was sprayed on the mold in a thin coat. Each of the following two urethane gum molding compositions was separately applied to the mold and released from the mold after curing. Thirty moldings were performed and no sticking or tearing occurred.

MOLDING COMPOUND F

| INGREDIENTS | PHR |
| --- | --- |
| Polyether/TDI Millable Urethane Gum | 50.0 |
| Butadine Acrylonitrile Copolymer | 35.0 |
| Styrene Butadiene Copolymer | 15.0 |
| Stearic Acid | 1.0 |

MOLDING COMPOUND F

| INGREDIENTS | PHR |
| --- | --- |
| Zinc Stearate | 0.5 |
| N-550 FEF Carbon Black | 25.0 |
| N-770 SRF Carbon Black | 15.0 |
| Kaolin (hard) Clay (hydrated aluminum silicate) | 50.0 |
| Dioctyl Phthalate | 14.0 |
| Petroleum Hydrocarbon | 2.0 |
| Polymerized 1,2-Dihydro-2,2,4-Trimethylquinoline | 3.0 |
| Benzothiazyl Disulfide | 4.0 |
| 2-Mercaptobenzothiazole | 2.0 |
| Partial complex of Zinc Chloride & Benzothiazyl Disulfide | 1.0 |
| 99% Pure Sulfur Powder | 2.0 |

MOLDING COMPOUND G

| INGREDIENTS | PHR |
| --- | --- |
| Polyether/TDI Millable Urethane Gum | 100.0 |
| Low Molecular Weight Polyethylene Powder | 2.0 |
| Zinc Stearate | 0.5 |
| Precipitated Hydrated Amorphous Silica | 35.0 |
| Coumarone-indene Resin | 10.0 |
| Teflon Powder MP-1500 | 1.0 |
| Naphthenic Oil | 1.0 |
| Blue Pigment in an EPDM binder 80% | 1.5 |
| Titanium Dioxide | 0.7 |
| Benzothiazyl Disulfide | 4.0 |
| 2-Mercaptobenzothiazole | 2.0 |
| Partial complex of Zinc Chloride & Benzothiazyl Disulfide | 1.5 |
| 99% Pure Sulfur Powder | 1.5 |

EXAMPLE IX 1720 grams of distilled water was mixed with 111 grams of the siloxanes, substituted vinyl and octyl phenol surfactant and synthetic ethoxylated amine surfactant in the proportion set forth in Composition II, above. To this aqueous mixture was added 34 of ethanol and 68 grams of methyl triethoxysilane. A second mixture was prepared containing 31 grams of a silanol terminated polydimethylsiloxane having a molecular weight of about 1000, 10 grams of a fluorinated alkyl ester surfactant and 14 grams of 1 Normal acetic acid.

The two mixtures were blended and sprayed on a four inch mold at ambient temperature. Both sides of the mold were heated to the molding temperature of 320 degrees F. A polyether millable urethane compound is applied repeatedly and cured in the mold and released twenty times with no noticeable sticking on the mold.

EXAMPLE X

A steel mold designed with a difficult undercut was employed. Any sticking at the undercut will result in a tear. The mold was first degreased and then sandblasted. The mold was heated to the molding temperature and the mold release composition of EXAMPLE IX above, was sprayed on the mold in a thin coat. Each of the following five elastomer molding compositions was separately applied to the mold and released from the mold after curing. Thirty moldings were performed and no sticking or tearing occurred.

MOLDING COMPOUND H

| | PHR |
|---|---|
| Ethylene/acrylic elastomer Silica (DuPont) | 123.0 |
| 2,2-methylene-bis (4-methyl-6-butyl phenol) oxidation inhibitor (American Cyanamid) | 2.0 |
| Fatty acid process aid (Harwick) | 0.5 |
| Foamed silica (Degussa) | 5.0 |
| Calcium carbonate (E.C.E. AMERICA) | 100.0 |
| N,N-di-phenylene dimaleimide peroxide vulcanizing coagent (DuPont) | 2.0 |
| Dicumyl peroxide vulcanizing agent (Hercules) | 7.0 |

MOLDING COMPOUND I

| | PHR |
|---|---|
| AFLAS ISOP | 100 |
| TAIC (75% dispersion) | 7.5 |
| Vul-Cuip 401SE | 2.5 |
| Sodium stearate | 2.0 |
| Medium Thermal Black | 28 |

MOLDING COMPOUND J

| | PHR |
|---|---|
| Fluoroelastomer (3M) | 100.0 |
| Medium thermal carbon black (Phillips Petroleum) | 30.0 |
| Magnesium oxide acid acceptor (Calgon) | 3.0 |
| Calcium hydroxide cure activator (Henley) | 6.0 |

MOLDING COMPOUND K

| | PHR |
|---|---|
| Morton International ST polysulfide rubber | 100 |
| Carbon black | 60 |
| Stearic acid | 1.0 |
| Zinc peroxide | 5.0 |
| Calcium hydroxide | 1.0 |

MOLDING COMPOUND L

| | PHR |
|---|---|
| Ethylene propylene diene terpolymer (Royalene 512 by Uniroyal) | 100.0 |
| Zinc diacrylate (Sartomer SR-633) | 4.0 |
| Silicon dioxide (Summit Chemical) | 100.0 |
| Calcined and surface modified Kaolin clay (Engelhard) | 100.0 |
| Paraffinic oil (R. E. Carroll) | 40.0 |
| Silane Coupling Agent vinyl-tris (2-methoxyethoxysilane (Union Carbide) | 1.0 |
| Dicumyl peroxide vulcanizing agent | 8.0 |

EXAMPLE XI 100 grams of Composition II above was prepared and one gram of hydroxyl terminated polybutadiene is mixed with Composition II with vigorous agitation in a turbina laboratory mixer. The mixture is then shaken and homogenized under high pressure.

MOLDING COMPOUND M

| INGREDIENTS | PHR |
|---|---|
| Polyether/TDI Millable Urethane Gum | 147.2 |
| Low Molecular Weight Polyethylene Powder | 2.0 |
| Zinc Stearate | 0.5 |
| Precipitated Hydrated Amorphous Silica | 35.0 |
| Coumarone-indene Resin | 10.0 |
| Teflon Powder MP-1500 | 1.0 |
| Naphthenic Oil | 1.0 |
| Blue Pigment in an EPDM binder 80% | 1.5 |
| Titanium Dioxide | 0.7 |
| Benzothiazyl Disulfide | 4.0 |
| 2-Mercaptobenzothiazole | 2.0 |
| Partial complex of Zinc Chloride & Benzothiazyl Disulfide | 1.5 |
| 99% Pure Sulfur Powder | 1.5 |

The mold release composition of this EXAMPLE XI was sprayed on a four inch mold at ambient temperature. Both sides of the mold were heated to the molding temperature of 350 degrees F. The molding compound M was applied to the molds repeatedly and cured in the molds and released on twelve occasions before sticking occurred.

EXAMPLE XII 2403 grams of distilled water was mixed with the following ingredients:

95% ethanol 20.7 grams an emulsified organosiloxane 164.4 grams potassium salt of oleic acid 91.2 grams methyl triethoxysilane 102 grams fluoro alkyl surfactant 5.7 grams 1/N acetic acid 5.7 grams a silanol terminated polydimethylsiloxane having a weight average molecular weight of 400 to 310,000 117.6 grams Proxel GXL (a fungicide) 0.9 grams hydroxyl terminated polybutadiene 150 grams The above ingredients are mixed for fifteen minutes and homogenized at 8000 p.s.i.

EXAMPLE XIII

The following mold release composition was prepared:

Distilled water 2403.6 grams

95% ethyl alcohol 21.6 grams emulsified organosiloxane 319.5 grams methyl triethoxysilane 90.9 grams fluoro alkyl surfactant 6.0 grams 1/N acetic acid 6.0 grams Proxel GXL (a fungicide) 0.9 grams hydroxyl terminated polybutadiene 150.0 grams The ingredients were mixed vigorously for fifteen minutes and homogenized at 8000 p.s.i.

EXAMPLE XIV

The following mold release composition was prepared:

Distilled water 2574 grams

95% ethyl alcohol 49.8 grams emulsified organosiloxane 164.4 grams a silanol terminated polydimethylsiloxane having a weight average molecular weight of 400 to 310,000 91.5 grams methyl triethoxysilane 102 grams fluoro alkyl surfactant 12.9 grams 1/N acetic acid 5.1 grams Proxel GT (a fungicide) 0.9 grams hydroxyl terminated polybutadiene 30 grams

EXAMPLE XV

The following mold release composition was prepared:

Distilled water 2424.3 grams

95% ethyl alcohol 49.8 grams emulsified organosiloxane 164.4 grams a silanol terminated polydimethylsiloxane having a weight average molecular weight of 400 to 310,000 91.5 grams methyl triethoxysilane 102 grams fluoro alkyl surfactant 12.9 grams 1/N acetic acid 5.1 grams Proxel GT (a fungicide) 0.9 grams Hydroxyl terminated polybutadiene 150.0 grams The mold release compositions containing a hydroxyl terminated polybutadiene can have the following ranges of ingredients by weight.

0.1 to 12% a silane selected from the group consisting of methyl trimethoxysilane, ethyltriethoxysilane, fluorotriethoxysilane, methyl triethoxysilane, vinyl triethoxysilane, vinyl trimethoxysilane, Gamma-ureidopropyltrialkoxysilane, where the alkoxy group has one to three carbon atoms, Gamma-glycidoxypropyltrimethoxysilane, octyltriethoxysilane, Gamma-amino propyltriethoxysilane, Gamma-isocyanatopropyltriethoxysilane, tetraethoxysilane, Gamma-methacryloxypropyl trimethoxysilane, Beta- (3, 4-epoxycyclohexyl) ethyltrimethoxysilane, Gamma-mercaptopropyltrimethoxysilane, and vinyl-tris (2-methoxyethoxy) silane, 0 to 16% a methyl terminated polydimethylsiloxane emulsified polymer, 0 to 10% a non-ionic surfactant, 0 to 12.5% a silanol terminated polydimethyl siloxane having a weight average molecular weight of 400 to 310,000, 0.1 to 8% a lower alkyl alcohol wherein the alkyl has 1–3 carbon atoms, 0.5 to 2% a weak acid such as acetic acid to maintain the pH between 4.5–5.5, 0 to 20% a metallic salt of an organic acid, 0 to 8% a fluorinated alkyl ester surfactant, 0 to 2.5% an ethoxylated amine surfactant, 0.1 to 15% a hydroxyl terminated polybutadiene, 0 to 2% a fungicide, and 40 to 97% water.

A preferred aqueous mold release composition contains a mixture of less than ten percent by weight of the methyl trimethoxysilane, methyl terminated polydimethylsiloxane emulsified polymer, fluorinated akyl ester surfactant and ethoxylated amine surfactant, together with about three percent by weight ethanol, 0.1 to 15% by weight hydroxyl terminated polybutadiene, less than one percent by weight acetic acid and the remainder water.

The methyl terminated polydimethylsiloxane emulsified polymer is a mixture of deca methyl cyclopentasiloxane, octo methyl cyclotetrasiloxane and dodeca methyl cyclohexasiloxane.

Another preferred composition contains less that ten percent by weight of a silane from the group methyl triethoxysilane, methyl trimethoxysilane, vinyl triethoxysilane and vinyl trimethoxysilane, a methyl terminated polydimethyesiloxane emulsified polymer, a nonionic surfactant, an ethoxylated amine surfactant, a fluorinated alkyl ester surfactant, a silanol terminated polydimethylsiloxane having a weight average molecular weight from 400 to 310,000 and a hydroxyl terminated polybutadiene, together with acetic acid in an amount to maintain the pH at 4.5 to 5.5 less than eight percent by weight ethanol and the remainder water.

A silanol terminated polydimethylsiloxane having a weight average molecular weight of about 1000 is preferred.

An aqueous mold release composition for use in coating compression and injection molding core surfaces comprises a mixture of less than ten percent by weight of a silane selected from the group consisting of methyl triethoxysilane, methyl trimethoxysilane, vinyl triethoxysilane silane and vinyl trimethoxysilane, a methyl terminated polydimethylsiloxane emulsified polymer, a non-ionic surfactant, an ethoxylated amine surfactant and a fluorinated alkyl ester surfactant, a silanol terminated polydimethylsiloxane having a weight average molecular weight from 400 to 310,000, and a hydroxyl terminated polybutadiene, together with acetic acid in an amount sufficient to maintain the pH at 4.5 to 5.5, about 0.5 to 8% ethanol and the remainder water.

A method of forming a mold release surface on a mold core comprises cleaning the core surfaces, heating both sides of the core surfaces to about 320 degrees F. and spraying the mold core with an aqueous composition containing less than thirty percent by weight of a mixture of a silane selected from the group consisting of methyl triethoxysilane, methyl trimethoxysilane, vinyl triethoxysilane, vinyl trimethoxysilane, methyl triphenoxysilane, ethyl-triethoxysilane, fluorotriethoxysilane, Gamma-ureidopropyltrialkoxysilane, where the alkoxy group has one to three carbon atoms, Gammaglycidoxypropyltrimethoxysilane, octyltriethoxysilane, Gamma-amino propyltriethoxysilane, Gamma-isocyanatopropyltriethoxysilane, tetraethoxysilane, Gamma-methacryloxypropyl trimethoxysilane, Beta- (3, 4-epoxycyclohexyl) ethyltrimethoxy silane, Gamma-mercaptopropyltrimethoxysislane, and vinyl-tris (2methoxyethoxy) silane, together with a methyl terminated polydimethylsiloxane emulsified polymer, a nonyl or octyl phenol surfactant, an ethoxylated amine surfactant, a fluorinated alkyl ester surfactant, about 2 to 8% by weight of a lower alkyl alcohol, having 1 to 3 carbon atoms, 0.1 to 12.5% by weight silanol terminated polydimethyl- siloxane having a weight average molecular weight between 400 and 310,000, about 0.1 to 15% by weight of a hyroxyl terminated polybutadiene, an acid to lower the pH to 4.5 to 5.5 and the remainder water.

An aqueous mold release composition according to the above compositions can specifically contain by weight in addition to 3.4% methyl triethoxysilane, 1.8% deca methyl cyclopentasiloxane, 1.6% octo methyl cyclotetrasiloxane, 0.6% dodeca methyl cyclohexasiloxane, 1.5% fluorinated alkyl ester surfactant, 0.3 % ethoxylated amine surfactant, 0.5% nonyl or octyl phenol surfactant, 3.0% silanol terminated polydimethylsiloxane having a weight average molecular weight between 400 and 310,000, 2.6% ethanol 1.0% acetic acid 82.7% distilled water and the remainder hydroxyl terminated polybutadiene.

Having thus described the invention what I claim and desire to be secured by Letters Patent is:

1. An aqueous mold release composition for use in coating core surfaces in contact with rigid or flexible urethane foams, or urethanes, silicones, natural rubber, neoprene or other synthetic elastomers, the composition comprising by weight:

0.1 to 12% a silane selected from the group consisting of methyl trimethoxysilane, ethyl-triethoxysilane, fluoro-triethoxysilane, methyl triethoxysilane, vinyl triethoxysilane, vinyl trimethoxysilane, Gamma-ureidopropyl-trialkoxysilane, where the alkoxy group has one to three carbon atoms, Gamma-glycidoxypropyltrimethoxysilane, octyltriethoxysilane, Gamma-amino propyltriethoxysilane, Gamma-isocyanatopropyltri-ethoxysilane, tetraethoxysilane, Gamma-methacryloxypropyl trimethoxysilane, Beta- (3, 4-epoxycyclohexyl) ethyltrimethoxy-silane, Gamma-mercaptopropyltrimethoxysilane, and vinyl-tris (2-methoxyethoxy) silane, 0 to 16% a methyl terminated polydimethylsiloxane emulsified polymer, 0 to 10% a non-ionic surfactant, 0 to 8% a fluorinated alkyl ester surfactant, 0 to 2.5% an ethoxylated amine surfactant, 0 to 12.5% a silanol terminated polydimethylsiloxane having a weight average molecular weight of 400 to 310,000, 0.1 to 8% a lower alkyl alcohol wherein the alkyl has 1–3 carbon atoms, 0 to 2% a fungicide, 0 to 20% a metallic salt of an organic acid, 0.5 to 2% a weak acid to maintain the pH between 4.5–5.5, 0.1 to 15% hydroxyl terminated polybutadiene, and 40 to 97% water.

2. The aqueous mold release composition according to claim 1 wherein the composition comprises a mixture of less than ten percent by weight of the methyl trimethoxysilane, methyl terminated poydimethylsiloxane emulsified polymer, fluorinated alkyl ester surfactant and ethoxylated amine surfactant together with about three percent by weight of ethanol, 0.1 to 15% by weight hydroxyl terminated polybutadiene, less than 1% by weight acetic acid and the remainder water.

3. The aqueous mold release composition according to claim 1 wherein the silane is methyl triethoxysilane.

4. The aqueous mold release composition according to claim 1 wherein the methyl terminated polydimethylsiloxane emulsified polymer is a mixture of deca methyl cyclopentasiloxane, octo methyl cyclotetrasiloxane, and dodeca methyl cyclohexasiloxane.

5. An aqueous mold release composition for use in coating compression and injection molding core surfaces comprising a mixture of less than ten percent by weight of a silane selected from the group consisting of methyl triethoxysilane, methyl trimethoxysilane, vinyl triethoxysilane and vinyl trimethoxysilane, a methyl terminated polydimethylsiloxane emulsified polymer, a non-ionic surfactant, an ethoxylated amine surfactant and a fluorinated alkyl ester surfactant, a silanol terminated polydimethylsiloxane having a weight average molecular weight from 400 to 310,000, and a hydroxyl terminated polybutadiene, together with acetic acid in an amount sufficient to maintain the pH at 4.5 to 5.5, about 0.5 to 8% by weight ethanol and the remainder water.

6. The aqueous mold release composition according to claim 5 wherein the silane is methyl triethoxysilane.

7. The aqueous mold release composition according to claim 5 wherein the weight average molecular weight of the silanol terminated polydimethylsiloxane is about 1000.

8. The aqueous mold release composition according to claim 5 wherein the composition comprises by weight about:

3.4% methyl triethoxysilane, 1.8% deca methyl cyclopentasiloxane, 1.6% octo methyl cyclotetrasiloxane, 0.6% dodeca methyl cyclohexasiloxane, 1.5% non-ionic fluorinated alkyl ester surfactant, 0.3 % ethoxylated amine surfactant, 0.5% nonyl or octyl phenol surfactant, 3.0% silanol terminated polydimethylsiloxane having a weight average molecular weight between 400 and 310,000, 2.6% ethanol 1.0% acetic acid, 82.7% distilled water and the remainder hydroxyl terminated polybutadiene.

9. A method of forming a mold release surface on a mold core comprising cleaning the core surfaces, heating both sides of the core surfaces to about 320 degrees F. and spraying the mold core with an aqueous composition containing less than thirty percent by weight of a mixture of a silane selected from the group consisting of methyl triethoxysilane, methyl trimethoxysilane, vinyl triethoxysilane, vinyl trimethoxysilane, methyl triphenoxysilane, ethyl-triethoxysilane, fluoro-triethoxysilane, Gamma-ureidopropyl-trialkoxysilane, where the alkoxy group has one to three carbon atoms, Gamma-glycidoxypropyltrimethoxysilane, octyltriethoxysilane, Gamma-amino propyltriethoxysilane, Gamma-isocyanatopropyltriethoxysilane, tetraethoxysilane, Gamma-methacryloxypropyl trimethoxysilane, Beta- (3, 4-epoxycyclohexyl) ethyltrimethoxy silane,Gamma-mercaptopropyltrimethoxysilane, and vinyl-tris (2-methoxyethoxy) silane, together with a methyl terminated polydimethylsiloxane emulsified polymer, a nonyl or octyl phenol surfactant, an ethoxylated amine surfactant, a fluorinated alkyl esters surfactant, about 2 to 8% by weight of a lower alkyl alcohol, having 1 to 3 carbon atoms, 0.1 to 12.5% by weight silanol terminated polydimethylsiloxane having a weight average molecular weight between 400 and 310,000, about 0.1 to 15% by weight of a hyroxyl terminated polybutadiene, an acid to lower the pH to 4.5 to 5.5 and the remainder water.

10. The method according to claim 9 wherein methyl triethoxysilane is the silane in the composition, together with acetic acid to lower the pH and ethanol as the lower alkyl alcohol.

* * * * *